Reissued Mar. 24, 1953

Re. 23,637

UNITED STATES PATENT OFFICE 23,637

METHOD OF COATING PAPER

William J. Montgomery, Hamilton, Ohio, assignor to The Champion Paper and Fibre Company, Hamilton, Ohio, a corporation of Ohio No Drawing. Original No. 2,568,288, dated September 18, 1951, Serial No. 24,419, April 30, 1948. Application for reissue April 9, 1952, Serial No. 281,450

32 Claims. (Cl. 117—64)

Matter enclosed in heavy brackets [ ] appears in the original patent but forms no part of this reissue specification; matter printed in italics indicates the additions made by reissue.

The present invention relates to the manufacture of cast-surfaced coated paper of the character disclosed in U. S. Patent No. 1,719,166.

In accordance with one procedure for manufacturing such paper, a web of paper with a layer of an aqueous fluid coating composition comprising pigment and adhesive is pressed against a polished or a smooth unpolished casting surface. Substantially all of the aqueous vehicle is evaporated from the coating and the coated paper is thereafter stripped from the casting surface, in finished form, requiring no supercalendering or other finishing treatment to be ready for use as a base for fine printing or for other purposes. The surface of coated paper made by that process is a substantial replica of the casting surface, and such papers have been found to possess a more attractive finish, and when cast on a polished surface, a much higher gloss than the previously known coated printing papers.

In order to produce cast coated paper of uniformly highly quality, the coating must adhere to the casting surface firmly enough to remain in intimate and undisturbed contact with it during a critical period of the drying and setting of the aqueous coating to a substantially non-plastic condition, in spite of any shrinkage strains which may develop in the paper.

It is also necessary to the continuous production of cast coated paper for the coating to release cleanly and completely from the casting surface after drying. If the dried coating adheres to the casting surface over large areas, the coating and often the paper itself will be torn and the machine will have to be shut down and thoroughly cleaned and reconditioned. If the sticking occurs only in small isolated areas, it is still necessary in a comparatively short time to shut down the machine and clean the casting surface, for even a tiny spot sticking to the casting surface mars the paper cast over that spot on each succeeding revolution and the spot increases in size with continued operation and soon reaches prohibitive dimensions.

The primary object of the present invention is to provide a method of continuously producing uniformly high quality cast-surfaced coated paper, wherein the coating adheres firmly to the casting surface until the coating has dried to a substantially non-plastic condition, and yet the dried coated paper is consistently, completely, and cleanly detached from the casting surface throughout long continued, uninterrupted operation.

In my prior Patent No 2,331,922, issued October 19, 1943, I have disclosed a method of making coated paper in one embodiment of which the coated surface of the sheet is brought into contact with a finishing drum carrying on its face a liquid film of oil to prevent the coating from sticking to the surface of the drum. By that process the liquid oil film prevents adhesion of the coating while still plastic, to the drum surface, and consequently the paper produced is quite different from a true cast-surfaced paper.

Contrary to what might be expected from the action of the oil film in the above mentioned process, I have discovered that what is presumably an oil film on the casting surface, can be made so thin that the uniform adhesion of the wet or plastic coating to the casting surface throughout its entire area will not be so lessened as to impair the cast surface; while still leaving the film thick enough to substantially eliminate the tendency of the coating, when dried to a non-plastic condition, to remain adherent to untreated casting surfaces. For this purpose it is thought the layer need be only one or a few molecules in thickness. It is known to be substantially less than one-half the wave-length of visible light since layers which show the irridescent bands visible in films of greater thickness, or which can be detected on the surface by usual tests, appear to be much too thick to permit sufficient adherence of the undried coating, to produce a true cast coated paper. I have also discovered that in actual operation such ultra-thin films soon lose their effectiveness, due it is thought to the oil being absorbed into the coating and carried away with the dried coated paper, so that, unless the film is constantly replenished, the dried coated paper soon begins to stick to the casting surface. I have further discovered that an oil film of excessive thickness, which prevents the formation of a cast surface on the paper, is soon reduced to suitable thickness by the same means.

These discoveries are utilized in my preferred method, wherein, as hereinafter described, a continuous film is first established on a clean casting surface, as by rubbing with an oleaginous conditioning or film-forming agent, the film is then reduced to the required degree of thinness, and is thereafter so maintained during the casting process.

When high-finished cast coated paper is to be produced, the casting surface must have a uniform high polish throughout its extent and must be free from dirt or foreign matter which, if present even in such small particles as not to be discernible, may cause the coating to stick, and it is therefore the practice to thoroughly clean and polish the casting surface immediately prior to the casting operations. In this case, the initial establishment of a continuous film on the casting surface may be conveniently accomplished in connection with the polishing operation itself. For this purpose the abrasive polishing agent is suspended in or mixed with an oleaginous film-forming agent such, for example, as a sulfonated vegetable oil, or other coating addition agent listed below.

After applying the conditioning agent to the casting surface as above described, the excess is removed by wiping with a cloth. Unless this wiping is quite vigorous and prolonged, the layer left on the casting surface will be of more than adequate thickness, which can then, utilizing the above stated discovery, be reduced to the thinness required for producing true cast coated paper by actual operation. In case of surfaces not readily wet with certain oleaginous materials, the wetting with, and the proper spreading of, such materials may be facilitated by first applying a layer of a soap to the surface. This may be accomplished by any desired method but may also be conveniently combined with the polishing or buffing operation. Magnesium oleate or other insoluble soap of an alkaline earth metal may be used, as well as soluble soaps such as ammonium stearate, etc. The application of both soap and oleaginous material may be advantageously accomplished simultaneously in combination with the polishing operation by admixing both the said oleaginous material and the soap with the polishing agent. After polishing, the surface may be wiped clean as above described.

I have found that the film can then be maintained in equilibrium at the effective thickness by incorporating in the coating composition one or more oleaginous materials or surface-active agents of an oleaginous nature and hereinafter called "oleaginous film-forming materials," which may be the same as or compatible with that used in the initial preparation of the casting surface. Suitable agents for this purpose include mineral and vegetable oils; various fats and fatty acids; sulfated or sulfonated oils and fatty acids; at least partially saponified oils, fats, and fatty acids; the amines of the higher fatty acid series; [tributyl phosphate;] certain greases; such materials as hydrogenated vegetable oils which may be solid at room temperature but liquid at operating temperatures; and the like. In this connection it may be noted that, inasmuch as the pH value of coating compositions of the type described is commonly of the order of 8 to 10, almost any saponifiable oil, fat, or fatty acid will unavoidably be at least partially saponified even though unsaponified at the time of its addition to the coating. Some oleaginous materials work better than others, and generally speaking, mineral oils appear not to serve the purpose as well as the vegetable oils. Fatty acids; saponified oils, fats, and fatty acids; sulfonated oils; etc., having from 8 to 22 carbon atoms in the chain and which tend to form oriented layers, seem to be especially useful for the present purpose. In general, all the oleaginous materials appear to be of value, both for initial establishment of the film and for addition to the coating, but they vary in degree of effectiveness. So far as I know, any relatively water-insoluble liquid which will wet the previously prepared casting surface and spread into a continuous film, yet will not vaporize too readily at operating temperatures (which are chosen to suit the particular conditions and are usually between 130° and 210° F.) will serve the purpose. These materials are, in the present specification and claims, designated as "oleaginous film-forming materials" even though many of the substances found suitable for the purpose may not be, strictly speaking, in that category.

For obvious reasons, colorless, odorless materials are particularly desirable, although the amount required is usually so small that color and odor in the material, unless quite pronounced, may not be objectionable. I find sulfonated castor oil to be quite satisfactory in many coatings. Tall oil, a by-product of the sulfate pulping process, or sulfonated tall oil, has been found to be effective in the present process.

The amount of oleaginous film-forming material ordinarily used in the coating for the purpose described, is of the order of $\frac{1}{10}$ per cent to 1 per cent on the dry weight of pigment. I have, however, found it impossible to establish generally applicable rules for determining the proportions of film-forming material required to maintain constant optimum operating conditions, since the actual amount required in any given case depends on the particular material used, on the method of incorporation, on the composition of the coating, and on the character of the particular lot of each of the various ingredients thereof. Also, as is well known, the casein of commerce contains greater or lesser amounts of butter fat as an impurity. Consequently, when using coating compositions containing casein as an adhesive, the amount of butter fat present in the casein should be considered in adjusting the amount of oleaginous material incorporated in the coating. However, in practical operation, the amount of oleaginous material to use is easily determined. The casting surface is first prepared as described, oleaginous film-forming material is incorporated in the coating in proportions estimated from the closest known examples, and operation is begun. If, in the course of a few revolutions of the casting drum or belt, a high-gloss, true cast-surfaced paper is not produced, the proportion of oleaginous material in the coating should be reduced. Otherwise, if a tendency of the dried paper to stick to the casting surface should at any time develop, the proportion of oleaginous material in the coating composition should be increased.

When a casting surface is prepared and maintained as described, the coating adheres so tightly thereto that there is no apparent relative movement of the coating and the casting surface until the coating has hardened. The coating, nevertheless, after drying, is readily, cleanly, and completely separable from the casting surface. A uniformly high-quality, high-gloss, true cast coated paper is the result, and continuous production for long periods of time, without stopping to clean or polish the casting surface, becomes possible.

The invention will be more clearly understood by reference to the following examples of the process, in each of which the coating adhered to the casting surface until set to a substantially non-plastic condition, after which it was readily, cleanly, and completely separated from the casting surface, whereby a true cast coated paper was produced.

Example 1

Coating material was prepared by thoroughly mixing 75 parts by weight of finely divided precipitated calcium carbonate, 25 parts of finely classified china clay, and 25 parts of water, with 12 parts, dry weight, of casein dissolved in ammonia water. One-eighth part of sulfonated castor oil and 1/20 part tributyl phosphate were then stirred in and the preparation of the coating material was completed by thoroughly mixing with additional water sufficient to bring the whole to approximately 50 per cent solids. The casting surface, which in this case was an internally heated, chromium-surfaced rotating cylinder, was prepared before use by polishing and rubbing down with an abrasive suspended in cylinder oil consisting of a mineral oil base and containing 5 to 8 per cent of tallow, and wiping with a soft cloth.

The paper web was a good grade of coating stock weighing about 43 pounds per ream (500 sheets 25 x 38 inches) with a light weight base coating applied during the manufacture of the paper on the paper machine. The above-described coating composition was applied to one side of the paper in excess of the amount required and the paper was pressed against the finishing surface, squeezing off the excess coating and leaving approximately 12 pounds of it per ream, dry weight. The operation was continuous and the oil film on the casting surface soon reached, and was thereafter maintained at a thickness in equilibrium with the oil content of the coating material. The finished paper had a truly typical cast surface with a gloss of 85 as measured by the Bausch and Lomb glossmeter.

Example 2

The coating material in this case was prepared by thoroughly mixing 100 parts dry weight of finely precipitated calcium carbonate, 13 parts of casein, and 1/2 part of zinc oxide, with sufficient ammonium hydroxide to dissolve the casein and form a complex zinc ammonium compound. During this mixing, enough water was added to bring the total solids to about 60%. The composition had a pH of 9.3. In this was incorporated about 1/6 part by weight, of oleic acid, and the whole was thoroughly mixed. Before using, water was added to reduce the mixture to a solids content of approximately 55%. At this point about .02 part of tributyl phosphate was added. The casting surface was an internally-heated, chromium-surfaced rotating cylinder, prepared before use by buffing with an impalpable abrasive powder thoroughly wetted with castor oil, and then wiping clean. The coating and casting operations were then carried out as described in Example 1.

Example 3

In this case the coating was similar to that in Example 1 except that 100 parts of calcium carbonate were used in place of the carbonate-clay mixture, and 15 parts instead of 12 parts of casein were used, the sulfonated castor oil was omitted and 1/2 part of mineral oil (American White Oil) was used in its stead. The casting surface was in this case of highly polished nickel instead of chromium. Before use, this surface was prepared by buffing with an abrasive polishing agent suspended in an emulsion made up of 80 parts water, 20 parts mineral oil (the same as incorporated in the coating) stabilized by a small amount of ammonium oleate.

Example 4

In this case the coating composition consisted of 75 parts by weight of finely precipitated calcium carbonate, 25 parts of finely clasified china clay, 15 parts of casein dispersed by ammonia water, 1/4 part of sulphonated castor oil, and 1/4 part of castor oil, with sufficient water to give a solids content of about 52%. The casting surface was in the form of an endless belt having a surface of polished nickel. It was prepared by buffing with an abrasive polishing agent mixed with 3 parts of castor oil and 1 part sulphonated castor oil, and then wiping the surface clean with a soft cloth.

Example 5

The coating in this case was made up of 100 parts of finely precipitated calcium carbonate, 12 parts of casein (dry weight) dissolved in ammonia water, to which was added 1/16 part of tall oil in ammonia water. The casting surface was in the form of an endless belt having a surface of polished nickel. Prior to starting operations, this surface was buffed using a commercial buffing compound of rouge and tallow. The coating and casting operations were carried on at a speed of about 300 feet per minute.

Example 6

The coating used in this case was composed of 100 parts of finely precipitated calcium carbonate, 12 parts of casein (dry weight) dissolved in ammonia water, 3/4 part of sulphonated castor oil neutralized with ammonia, together with sufficient water to bring the whole to 56 per cent total solids. The casting surface was, in this case, of stainless steel and in the form of an endless belt. It was prepared, prior to use, by buffing with a compound made up of levigated alumina suspended in cylinder oil consisting of mineral oil base containing a small proportion of animal fat and free fatty acid.

Example 7

In this case the coating was composed of 100 parts of finely precipitated calcium carbonate with 30 parts (dry weight) of starch, and about 3/4 part of sulphonated castor oil neutralized with ammonia, with enough water to bring the whole to about 60 per cent total solids. The casting surface was of polished nickel which had been prepared, prior to use, by buffing with a polishing agent in a fatty acid.

Example 8

In this case the coating contained 100 parts of coating clay, 35 parts of casein, and 1/4 part of sulphonated castor oil. The casting surface was of chromium prepared as in Example 2, and the operation was as described.

Example 9

In this case the coating material contained 100 parts of finely precipitated calcium carbonate, 16 parts of casein, 10 parts of castor oil, 0.05 parts of red oil, with water to make a coating composition containing about 50% total solids. The casting surface was of chromium polished and prepared in the manner already described. The coating material was applied to the paper and dried in contact with the prepared casting surface. After the operation had continued long enough for conditions of equilibrium to become established, the dried coated paper separated readily, cleanly, and completely from the casting surface, but had a true cast surface with uniform high gloss (88 as measured on the Bausch and Lomb glossmeter), showing that the coating had adhered firmly to the casting surface until it had completely set to its final form.

In the foregoing Examples 1 to 8 the oleaginous agents were used in approximately the minimum amounts needed, under the specific conditions set forth in each instance, to maintain on the casting surface, over long periods of continuous operation, presumably by adsorption from the coating composition, a film of optimum thickness for the purpose described. It has been my experience, however, that by prolonged mixing or the use of appropriate emulsifying agents, much larger proportions of oleaginous material can be incorporated in the coating, if desired for any reason, without building up the film on the casting surface to an extent which would prevent the formation of a true cast surface on the coated paper. This is illustrated in Example 9 wherein it is thought that the casein probably served as an emulsifying agent so that only a small part of the total oil content was available at the casting surface, and the thickness of the oil film was accordingly not built up as is normally the case when the oil content of the coatings is increased by much smaller amounts.

In the accompanying claims I have arbitrarily designated the oleaginous agent added to the coating composition in order to maintain the surface of the drum in the desired condition as "oleaginous film-forming material," and it is to be understood that the designation in the claims of a specified quantity of oleaginous film-forming material is not intended to limit the claims to exclude coating compositions wherein a greater quantity of oil or oleaginous material is added by emulsifying the oil or oleaginous material or using emulsifying agents or otherwise rendering a portion of the oil or oleaginous material ineffective.

It is also to be understood that whereas for commercial practice it is desirable to maintain the film of oleaginous material on the casting surface by the addition of the oleaginous film-forming material to the coating composition, continuous operation with satisfactory results may be maintained by periodic or continuous application of the oleaginous compound to the casting surface. For example, if an endless belt is used to supply the continuously moving casting surface, the face of the belt during its return passage may be treated periodically or continuously with the oleaginous substance and any surplus wiped off in a manner similar to that hereinbefore described for the initial preparation of the casting surface. The film so applied may be regulated, for example by applying the oleaginous conditioning agent in the form of a solution of any desired concentration. If the quality of the paper indicates that the adhesion has not been maintained throughout the drying period, the concentration of the conditioning agent may be decreased or the application may be temporarily suspended until the appearance of the paper once more indicates optimum operating conditions. On the other hand, if the coating shows a tendency to stick to the casting surface, the concentration of the conditioning agent in the solvent may be increased until optimum conditions once more obtain.

In the present specification and claims I have defined the surface as covered with a film or layer of oleaginous material. It is so defined, in spite of the fact that it cannot be seen and its presence cannot be detected by any usual test for the presence of oil or such material, because the condition of the surface appears to be intermediate between that in which it carries a detectable film and cast coated paper cannot be produced thereon, and that in which every trace of oil or oleaginous material has been removed by washing with a solvent, an alcoholic solution of caustic, or the like, and coated paper dried thereon cannot be removed except by its complete disintegration. The adherence to the casting surface during the setting of the coating to a non-plastic condition, and the free release after drying, are the only tests known to me by which the presence of the herein-defined film can be determined. Although it is not definitely known whether the oleaginous material is present as a continuous film or in some other form, it is assumed that the condition of the surface which makes possible the continuous production of true cast coated paper for long periods of time, is due either to the presence of an invisible continuous film of oleaginous material or of some compound produced by the application of the oleaginous material. It is therefore to be understood that the expression "film of oleaginous film-forming material" as used in the appended claims is intended to define the condition of the casting surface which results from the practice described and is not intended to describe a condition of the casting surface which can be directly determined by observation and measurement.

The thickness of the film of oleaginous material is above defined as less than one-half the wave length of light because this is the only definitely known fact regarding it, though, as hereinbefore set forth, it is believed to be much less than this. The wave length of visible light varies from 4000 Angstrom units at the violet end of the spectrum to 7000 Angstrom units at the red end. See, for example, page 2071, Handbook of Chemistry and Physics, Hodgman, 30th edition. It can therefore be definitely stated that the film of oleaginous material is substantially less than 2000 Angstrom units in thickness.

By the expression "cast surfaced coated paper" as used in the appended claims is meant a paper wherein the surface of the wet coating is pressed in contact with a casting surface to which it is maintained in immovable relation by the adhesion between the wet coating composition and the casting surface until the coating composition is dried until it is no longer plastic and the surface characteristics of the paper are a replica of the characteristics of the casting surface.

It will also be understood that my invention is not limited to the process as hereinbefore described except insofar as defined in the appended claims.

This application is a continuation-in-part of application Serial No. 436,970 filed March 31, 1942, now abandoned.

I claim:

1. In the process of making cast surfaced coated paper wherein an aqueous coating composition comprising adhesive and insoluble filler which is adherent to a finished casting surface while plastic is set to a non-plastic condition while immovably adhering to said casting surface, the improvement which comprises maintaining on said casting surface an invisible continuous film of oleaginous material of a thickness substantially less than 2000 Angstrom units and insufficient to interfere with the adherence of the coating to the casting surface while the coating is wet but of a thickness and continuity sufficient to effect a clean separation of the dried coating from the casting surface.

2. The process of claim 1 wherein the film of oleaginous film-forming material is maintained on the casting surface by adsorption from oleaginous film-forming material contained in the coating composition.

3. The method of claim 2 in which the oleaginous film-forming material used in the coating composition is a sulfonated vegetable oil.

4. The method of claim 2 in which the oleaginous film-forming material in the coating composition is a fatty acid.

5. The method of claim 2 in which the oleaginous film-forming material in the coating composition is at least partially saponified.

6. The process of claim 1 wherein the film of oleaginous film-forming material is initially established by treating the casting surface with oleaginous film-forming material in excess of the required amount and removing oleaginous film-forming material until the desired condition is obtained.

7. The process of claim 6 wherein the film of oleaginous film-forming material after being initially established is maintained by adsorption of oleaginous film-forming material contained in the coating.

8. The improvement in the process of making cast-surfaced coated paper as set forth in claim 6, wherein the treatment of the casting surface comprises the application thereto of a continuous film of at least partially saponified oleaginous film-forming material prior to the operation of contacting the wet coated side of the paper therewith.

9. The process of manufacturing cast-surfaced coated paper which consists in applying to a web of paper a layer of aqueous fluid coating composition comprising insoluble filler, adhesive, and film-forming oleaginous material in an amount in the order of one-tenth to one per cent of the weight of the coating composition, dry basis, and drying said coating in contact with a casting surface having thereon a continuous film of oleaginous material of a thickness less than 2000 Angstrom units, the amount of said oleaginous film-forming material incorporated in the coating composition being such as to maintain on said casting surface, by adsorption thereon, a continuous film of oleaginous material of a thickness less than 2000 Angstrom units and insufficient to prevent adhesion of the coating composition to the casting surface until the coating composition is substantially dry, but sufficient to effect a clean separation of the dried coating from the casting surface.

10. The process of claim 9 wherein the film-forming oleaginous material in the coating composition is in at least partially saponified condition.

11. The process of claim 9 wherein the molecules of the film-forming oleaginous material incorporated in the coating have from 8 to 22 carbon atoms in the chain and tend to form oriented layers on solid surfaces.

12. The process of claim 9 wherein the film is initially established on the casting surface by polishing the surface with a polishing agent containing an oleaginous film-forming material and wiping off any remaining visible deposit of said oleaginous material.

13. The process of manufacturing cast-surfaced coated paper which consists in applying to a web of paper a layer of aqueous fluid coating composition comprising insoluble filler, adhesive, and film-forming oleaginous material in a small amount up to the order of one per cent of the weight of the coating composition, dry basis, applying a thin continuous film of oleaginous material to the casting surface to render it compatible with the said film-forming oleaginous material in the coating composition, and drying said coating in contact with a casting surface, the amount of said film-forming oleaginous material in the coating composition being such as to maintain on said casting surface, by adsorption thereon, a continuous film of oleaginous material of a thickness less than 2000 Angstrom units and insufficient to prevent adhesion of the coating composition to the casting surface until the coating composition is substantially dry, but sufficient to effect a clean separation of the dried coating from the casting surface.

14. The process of manufacturing cast coated paper which consists in applying to a web of paper a layer of aqueous fluid coating composition comprising insoluble filler, adhesive and a film-forming oleaginous material, applying to the casting surface a thin film of oleaginous material, removing the free oleaginous material from the surface by repeated rubbing with a dry cloth and drying the coating in contact with said casting surface, the amount of film-forming oleaginous material in the coating composition being such as to maintain on said casting surface by adsorption thereon a continuous film of oleaginous material of a thickness less than 2000 Angstrom units and insufficient to prevent adhesion of the coating composition to the casting surface until the coating composition is substantially dry but sufficient to effect the clean separation of the dried coating from the casting surface.

15. In the process of making cast surfaced coated paper by applying aqueous coating composition comprising adhesive and insoluble filler to a web of paper and setting the coating to a substantially non-plastic condition by drying in contact with a casting surface, said coating being of a character to adhere to the casting surface while plastic, the steps of establishing on the casting surface a continuous distribution of oleaginous film-forming material, and of maintaining on said casting surface, during operation, an invisible continuous distribution of oleaginous film-forming material of a thickness less than that which will make a visible mark on a clean white cloth rubbed against the surface, by incorporating in the coating composition, prior to its application to the paper, an amount of oleaginous film-forming material on the order of from one-tenth to one percent of the coating composition, dry basis.

16. The process of manufacturing cast surfaced coated paper which consists in applying to a web of paper a layer of aqueous fluid coating composition comprising insoluble filler, adhesive, and oleaginous film-forming material in an amount in the order of one-tenth to one percent of the weight of the coating composition, dry basis, and drying said coating in contact with a casting surface, the amount of said oleaginous film-forming material being such as to maintain on said casting surface, by adsorption thereon, a film of oleaginous material of a thickness insufficient to prevent adhesion of the coating composition to the casting surface until the coating composition is substantially dry.

17. The process of claim 16 wherein the casting surface is given a preliminary application of oleaginous film-forming material to prevent initial sticking of the coating to the casting surface.

18. The process of claim 16 in which the oleaginous film-forming material used in the coating composition is sulphonated castor oil.

19. The process of claim 16 in which the oleaginous film-forming material used in the coating composition is tall oil.

[20. The process of claim 16 in which the oleaginous film-forming material used in the coating composition is tributyl phosphate.]

21. In the process of making cast surfaced coated paper wherein an aqueous coating composition comprising adhesive and insoluble filler, which is adherent to a finished coating surface while plastic, is set to a non-plastic condition while immovably adhering to said finished casting surface and paper, and thereafter removing the coated paper from said finished casting surface; the improvement which comprises incorporating in the coating composition prior to its application to the paper a film-forming oleaginous material, and so adjusting the proportion of said film-forming oleaginous material in the coating composition that, in continued operation, the coating adheres to the casting surface until non-plastic and thereafter upon further drying becomes non-adherent.

22. In the process of making cast surfaced coated paper by applying fluid aqueous coating composition comprising adhesive and insoluble filler to a web of paper, pressing the coated surface of the paper, before the coating thereon has reached a non-plastic condition, against a finished casting surface to which it is adherent, drying the coated surface of the paper to a substantially non-plastic condition while it is in contact with said casting surface, and thereafter removing the coated paper therefrom; the improvement which comprises incorporating in the coating composition, prior to its application to the paper, a film-forming oleaginous material, treating the casting surface to render it suitably wettable with said film-forming oleaginous material, and so adjusting the proportion of film-forming oleaginous material in the coating composition that, in continued operation, the coating adheres to the casting surface until non-plastic and thereafter upon further drying becomes non-adherent.

23. The improvement in the process of making cast surfaced coated paper, as set forth in claim 22, wherein the treatment of the casting surface comprises the application thereto of a film of soap prior to the operation of pressing the wet coated side of the paper thereon.

*24. The improvement defined in claim 1 wherein the film is maintained on the casting surface by continuously applying a solution of film-forming oleaginous material to said casting surface.*

*25. The improvement defined in claim 1 wherein the film is initially established by rubbing the casting surface with a film-forming oleaginous material.*

*26. The improvement defined in claim 25 wherein the oleaginous film-forming material comprises a compound selected from the group consisting of fatty acids, saponified oils, saponified fats, saponified fatty acids, and sulfonated oils, having from 8 to 22 carbon atoms in the chain and tending to form oriented layers.*

*27. The improvement defined in claim 1 wherein the film is initially established by cleaning the casting surface and rubbing said surface with a film-forming oleaginous material.*

*28. The improvement defined in claim 1 wherein the film is initially established by rubbing the casting surface with a compound containing an abrasive polishing agent mixed with a film-forming oleaginous material.*

*29. The improvement defined in claim 28 wherein the oleaginous material comprises a compound selected from the group consisting of fatty acids, saponified oils, saponified fats, saponified fatty acids, and sulfonated oils, having from 8 to 22 carbon atoms in the chain and tending to form oriented layers.*

*30. The improvement defined in claim 2 wherein the film is initially established by cleaning the casting surface and rubbing said surface with a film-forming oleaginous material.*

*31. The improvement defined in claim 30 wherein the oleaginous film-forming material comprises a compound selected from the group consisting of fatty acids, saponified oils, saponified fats, saponified fatty acids, and sulfonated oils, having from 8 to 22 carbon atoms in the chain and tending to form oriented layers.*

*32. The improvement defined in claim 2 wherein the film on the casting surface is maintained at the stated thickness by increasing the proportion of oleaginous film-forming material in the material applied to the casting surface when the tendency appears for the dried coating to stick to the casting surface and decreasing the proportion of oleaginous film-forming material when the tendency appears for the dried coating to fail adequately to reproduce the gloss of the casting surface.*

*33. The improvement defined in claim 32 wherein the film is initially established by rubbing the casting surface with a compound containing an abrasive polishing agent mixed with a film-forming oleaginous material.*

WILLIAM J. MONTGOMERY.

REFERENCES CITED

The following references are of record in the file of this patent or the original patent:

UNITED STATES PATENTS

| Number | Name | Date |
|---|---|---|
| 1,719,166 | Bradner | July 2, 1929 |
| 2,069,786 | Van der Meulen | Feb. 9, 1937 |
| 2,331,922 | Montgomery | Oct. 19, 1943 |

Certificate of Correction

Reissue No. 23,637 March 24, 1953

WILLIAM J. MONTGOMERY

It is hereby certified that error appears in the printed specification of the above numbered patent requiring correction as follows:

Column 1, line 23, for "highly" read high ; column 11, line 15, for "coating" read casting ;

and that the said Letters Patent should be read as corrected above, so that the same may conform to the record of the case in the Patent Office.

Signed and sealed this 1st day of September, A. D. 1953.

[SEAL]

ARTHUR W. CROCKER,
*Assistant Commissioner of Patents.*